US005730774A

United States Patent [19]
Hollitt et al.

[11] Patent Number: 5,730,774
[45] Date of Patent: Mar. 24, 1998

[54] PROCESS FOR UPGRADING TITANIFEROUS MATERIALS

[75] Inventors: Michael John Hollitt; Ross Alexander McClelland, both of Victoria, Australia

[73] Assignee: Technological Resources PTY Ltd., Melbourne, Australia

[21] Appl. No.: 535,074

[22] PCT Filed: May 9, 1994

[86] PCT No.: PCT/AU94/00241

§ 371 Date: Apr. 1, 1996

§ 102(e) Date: Apr. 1, 1996

[87] PCT Pub. No.: WO94/26944

PCT Pub. Date: Nov. 24, 1994

[30] Foreign Application Priority Data

May 7, 1993 [AU] Australia ................... PL8679

[51] Int. Cl.$^6$ ........................................... C22B 1/02
[52] U.S. Cl. ........................ 75/419; 75/435; 423/83
[58] Field of Search ................. 75/435, 419; 423/83

[56] References Cited

U.S. PATENT DOCUMENTS 5,063,032  11/1991  Gueguin ..................... 75/433

FOREIGN PATENT DOCUMENTS

94/03647  2/1994  WIPO ........................ 75/435

*Primary Examiner*—Melvyn Andrews
*Attorney, Agent, or Firm*—Dennison, Meserole, Pollack & Scheiner

[57] ABSTRACT

A process for removing impurities from a titaniferous material that has been subjected to thermal reduction and which includes a titaniferous phase of general formula $M_3O_5$. The thermally reduced titaniferous material is subjected to a secondary heat treatment to covert the $M_3O_5$ phase to a more readily leachable $M_2O_3$ phase. This material is then cooled and leached in an aqueous acid solution containing hydrochloric acid or sulfuric acid, and the leachate is separated from the titaniferous material to form a purified titaniferous material.

12 Claims, No Drawings

PROCESS FOR UPGRADING TITANIFEROUS MATERIALS

BACKGROUND OF THE INVENTION

This invention relates to the removal of impurities from naturally occurring and synthetic titaniferous materials. The invention is particularly suited to the production of feed material for industrial chlorination systems, as used in the production of titanium metal and titanium dioxide pigments.

SUMMARY OF THE INVENTION

Embodiments of the present invention have the common feature of annealing or other heat treatment of temperature reduction processing. The annealing or heat treatment is conducted in such a manner that impurities which have been converted by high temperature treatment into forms which can only be leached with difficulty are transformed into forms from which impurities can be leached with relative ease. The annealing or heat treatment is followed at some stage by cooling and aqueous leaching as steps in an integrated process. Additional steps may be employed as will be described below.

In industrial chlorination processes titanium dioxide bearing feedstocks are fed with coke to chlorinators of various designs (fluidised bed, shaft, molten salt), operated to a maximum temperature in the range 700°–1200° C. The most common type of industrial chlorinator is of the fluidised bed design. Gaseous chlorine is passed through the titania and carbon bearing charge, converting titanium dioxide to titanium tetrachloride gas, which is then removed in the exit gas stream and condensed to liquid titanium tetrachloride for further purification and processing.

The chlorination process as conducted in industrial chlorinators is well suited to the conversion of pure titanium dioxide feedstocks to titanium tetrachloride.

However, most other inputs (i.e. impurities in feedstocks) cause difficulties which greatly complicate either the chlorination process itself or the subsequent stages of condensation and purification and disposal of waste. Table 1 provides an indication of the types of problems encountered. In addition, each unit of inputs which does not enter products contributes substantially to the generation of wastes for treatment and disposal. Some inputs (e.g. heavy metals, radioactives) result in waste classifications which may require specialist disposal in monitored repositories.

Preferred inputs to chlorination are therefore high grade materials, with the mineral rutile (at 95–96% $TiO_2$) the most suitable of present feeds. Shortages of rutile have lead to the development of other feedstocks formed by upgrading naturally occurring ilmenite (at 40–60% $TiO_2$).

TABLE 1

| Elemental Input | Chlorination | Condensation | Purification |
|---|---|---|---|
| Fe, Mn | Consumes chlorine, coke, increases gas volumes | Solid/liquid chlorides foul ductwork, make sludges | |
| Alkali & alkali earth metals | Defluidise fluid beds due to liquid chlorides, consume chlorine, coke | | |
| Al | Consumes chlorine, coke | Causes corrosion | Causes corrosion, makes sludges |
| Si | Accumulates in chlorinator, reducing campaign life. Consumes coke, chlorine | Can encourage duct blockage. Condenses in part with titanium tetrachloride | May require distillation from product |
| V | | | Must be removed, by chemical treatment and distillation |
| Th, Ra | Accumulates in chlorinator brickwork, radioactive; causes disposal difficulties | | | such as titaniferous glag (approximately 86% $TiO_2$) and synthetic rutile (variously 92–95% $TiO_2$). These upgrading processes have had iron removal as a primary focus, but have extended to removal of manganese and alkaline earth impurities, as well as some aluminium.

In the prior art, synthetic rutile has been formed from titaniferous minerals, e.g. ilmenite, via various techniques. According to the most commonly applied technique, as variously operated in Western Australia, the titaniferous mineral is reduced with coal or char in a rotary kiln, at temperatures in excess of 1100° C. In this process the iron content of the mineral is substantially metallised. Sulphur additions are also made to convert manganese impurities partially to sulphides. Following reduction the metallised product is cooled, separated from associated char, and then subjected to aqueous aeration for removal of virtually all contained metallic iron as a separable fine iron oxide. The titaniferous product of separation is treated with 2–5% aqueous sulphuric acid for dissolution of manganese and some residual iron. There is no substantial chemical removal of alkali or alkaline earths, aluminium, silicon, vanadium, or radionuclides in this process as disclosed or operated. Further, iron and manangese removal is incomplete. As a result of the high temperature treatment given the product of this process can only be leached for additional removal of impurities with difficulty.

Recent disclosures have provided a process which includes reduction to metallise ilmenite at lower temperatures and provides for leaching after aqueous aeration and iron oxide separation steps. According to these disclosures the process is effective in removing iron, manganese, alkali and alkaline earth impurities, a substantial proportion of aluminium inputs and some vanadium as well as thorium. The process may be operated as a retrofit on existing kiln based installations. However, the process is ineffective in full vanadium removal and has little chemical impact on silicon. The leaching step of this process operated for some materials, notably those having higher than average magnesium levels, can require excessive acid strengths or pressure leach conditions, i.e. is conducted only with difficulty.

In another prior art invention relatively high degrees of removal of magnesium, manganese, iron and aluminium have been achieved. In one such process ilmenite is first thermally reduced to substantially complete reduction of its ferric oxide content (i.e. without substantial metallisation), normally in a rotary kiln. The cooled, reduced product is then leached under 35 psi pressure at 140°150° C. with excess 20% hydrochloric acid for removal of iron, manganesium, aluminium and manganese. The leach liquors are spray roasted for regeneration of hydrogen chloride which is absorbed into water and recirculated to the leaching step.

In other processes the ilmenite undergoes grain refinement by thermal oxidation followed by thermal reduction (either in a fluidised bed or a rotary kiln). The cooled, reduced product is then subjected to atmospheric leaching with excess 20% hydrochloric acid, for removal of the deleterious impurities. Acid regeneration is also performed by spray roasting in this process.

In all of the above mentioned hydrochloric acid leaching based processes impurity removal is similar. Vanadium, aluminium and silicon removal is not fully effective. For those processes in which contained iron is not in part converted to metallic iron for ease of removal, acid consumption in the leach step is high, which can impact negatively on the economics of processing. Where iron is substantially converted to metallic iron under high temperature conditions of reduction with solid carbonaceous reductants, allowing good economics of iron removal for the majority of the contained iron, leaching of residual impurities becomes more difficult, requiring elevated pressures or very high strength acid.

In yet another process ilmenite is thermally reduced (without metallisation) with carbon in a rotary kiln, followed by cooling in a nonoxidising atmosphere. The cooled, reduced product is leached under 20–30 psi gauge pressure at 130° C. with 10–60% (typically 18–25%) sulphuric acid, in the presence of a seed material which assists hydrolysis of dissolved titania, and consequently assists leaching of impurities. Hydrochloric acid usage in place of sulphuric acid has been claimed for this process. Under such circumstances similar impurity removal to that achieved with other hydrochloric acid based systems is to be expected. Where sulphuric acid is used radioactivity removal may not be complete.

A commonly adopted method for upgrading ilmenite to higher grade products is to smelt ilmenite with code addition in an electric furnace, producing a molten titaniferous slag (for casting and crushing) and a pig iron product. Of the problem impurities only iron is removed in this manner, and then only incompletely as a result of compositional limitations of the process. The product so formed is not amenable to further upgrading by leaching at reasonable acid utilisations or without pressure leaching, i.e. it can only be upgraded by leaching with difficulty.

A wide range of potential feedstocks is available for upgrading to high titania content materials suited to chlorination. Examples of primary titania sources which cannot be satisfactorily upgraded by prior art processes for the purpose of producing a material suited to chlorination include hard rock (non detrital) ilmenites, siliceous leucoxenes, many primary (unweathered) ilmenites and large anatase resources. Many such secondary sources (e.g. titania bearing slags) also exist.

For some upgraders of titania bearing feedstocks, in particular those who operate reduction in rotary kilns with solid carbonaceous reductants and those who operate smelting reduction, there is considerable incentive to continue to use installed capital equipment to achieve the present level of upgrading. The aim of further upgrading would then be best served by installing further plant and equipment as a retrofit to existing facilities. In each of these cases the existing high temperature processing operations as presently conducted will result in products which can only be leached for impurity removal with difficulty. This is especially the case for input materials having levels of magnesium which are higher than normal.

Clearly there is a considerable incentive to discover methods for converting titaniferous materials which have been produced by processes involving high temperature reduction processing into forms which can more readily be upgraded by acid leaching.

An object of the present invention is to provide processing steps which may be incorporated into more general processes for the upgrading of titaniferous materials, rendering such processes applicable to the treatment of a wider range of feeds and producing higher quality products than would otherwise be achievable.

Accordingly the present invention provides a process for removing impurities from a titaniferous material that has been subjected to thermal reduction, the process including the steps of:

(i) subjecting the thermally reduced titaniferous material to a secondary heat treatment to convert it to a leachable form in which impurities present therein are more readily leachable;

(ii) cooling the product of step (i) to form a cooled heat treated titaniferous material;

(iii) leaching the cooled heat treated titaniferous material in an aqueous acid solution that is capable of dissolving at least a portion of any impurities containing in the titaniferous material to form a leachate; and (iv) separating the leachate from the titaniferous material to form a purified titaniferous material.

It has been discovered that the above processing steps enable the removal of iron, magnesium and other alkaline earths, alkali metals, manganese, thorium and radioactivity, which impurities are frequently completely removed only with difficulty from thermally processed titaniferous materials.

DETAILED DESCRIPTION OF THE INVENTION

The secondary heat treatment step may be carried out in any suitable device. The advantages of temperature and atmosphere control offered by fluidised bed devices would recommend that fluidised beds, either stationary or circulating, be used, although rotary or grate kilning and shaft furnaces may also be used. The operating temperature or temperature cycle employed may be any such temperature or cycle which has the effects of rendering impurities more leachable under the atmosphere used. In general, the combination of temperature or temperature cycle and atmosphere or atmosphere cycle should be such that the product of annealing or heat treatment has the majority of its contained iron in the ferrous or metallic state and only a small proportion of its contained titanium in other than the tetravelent state. Thermal processing atmosphere and temperature control for the secondary heat treatment may be achieved either by introduction of gases of controlled composition and temperature, e.g. by partial or complete combustion of fuels, or by direct addition of reductant and/or fuel and air to the chamber in the device in which the mineral is held. Fuel and/or reductant may be solid fuels such as coal or char, liquid fuels such as oil, or gaseous fuel/reductant such as natural gas, reformed natural gas, petroleum gas, reformed petroleum gas or suitable gaseous products from other processes or reactors.

The secondary heat treatment residence time will depend on the nature of the prior treatments, the feed, the operating temperature, and the processing atmosphere. Residence times of from 30 minutes to five hours have been effective.

The effect of secondary heat treatment on the oxidation state of the titaniferous material may be to oxidise or reduce the material or to have no appreciable effect. Under most circumstances it will be beneficial to slightly oxidise the material or to affect no net change in oxidation state overall, within the constraints defined above as to the composition of the heat treated material.

Cooling of the thermally treated material may be conducted in any manner which does not prove to be detrimental in practical terms to the ease with which the heat treated product can be acid leached for impurity removal. Cooling in a rotary cooler or a fluidised bed cooler will be effective. Direct quench cooling upon discharge will also be effective under many circumstances.

The aqueous acid leaching step need not necessarily follow directly after the presently disclosed thermal processing step. For example an aeration step or a leach with non-acidic leachant, e.g. a caustic leach may precede the acid leach. Further, crushing/grinding of the thermally processed material to enhance subsequent leach performance may be undertaken.

The conditions necessary to conduct effective leaching will depend on the nature of the original feed and its treatment. Generally the product of annealing or heat treatment will be capable of being leached for at least partially effective removal of contained impurities in an hydrochloric acid leach liquor containing 10% HCl by weight under boiling reflux at atmospheric pressure. However, either milder or more aggressive leach conditions may be used, and any effective commercial acid may be applied. In particular, sulphuric acid and hydrochloric acid may be used for leaching. Pressure leaching, while generally unnecessary, may also be used.

Leaching may be conducted in any circuit configuration, including batch single or multiple stage leaching, continuous concurrent multistage leaching, or continuous countercurrent multistage leaching. For most circumstances two stage concurrent leaching will be most beneficial. Average residence time may vary from 30 minutes to 10 hours, depending on process conditions. Nay leach vessel capable of providing adequate shear may be used. Simple stirred tank vessels are applicable.

At the conclusion of leaching the leach liquor may be separated from the mineral by any suitable means, including thickening, filtration and washing. The mineral product may then pass onto other steps in an integrated process. For example, a further leach, for example a caustic leach, may follow the disclosed leaching step.

It is further herein disclosed that titaniferous materials which by virtue of prior treatments contain phases of the type "anosovite" or "pseudobrookite", i.e. generally contain a phase whose chemical composition can be summarised as "$M_3O_5$", and therefore are leached for removal of impurities contained within this phase only with difficulty, can be treated by the heat treatment step to produce preferentially the ilmenite-like impurity bearing phase whose chemical composition can be summarised as "$M_2O_3$". This latter phase is much more readily leached for removal of impurities than the original impurity bearing phase. In particular, in the reduction of titaniferous materials containing elevated levels of magnesium to remove iron from titaniferous phases by the formation of metallic iron the "$M_3O_5$" phase cannot easily be avoided. Consequently acid leaching of such materials reduced in this manner will be most effective if a secondary heat treatment step can be successfully conducted, as is herein disclosed.

The present invention is described further by reference to the following examples.

Example 1

This example illustrates the ineffectiveness of leaching of thermally processed materials in the absence of any secondary heat treatment.

A commercially available synthetic rutile product produced by the Becher process and containing elements other than Ti primarily in an $M_3O_5$ (pseudobrookite or anosovite) phase was leached under strong agitation with aqueous 20% HCl at 30% (by weight) solids density for 6 hours. At the end of this time the leach residue was separated from the leach liquors by filtration and washing.

Synthetic rutile feed and residue analyses are summarised in Table 1. While there has been some iron removal (presumably due to dissolution of attached iron oxides or metallic iron) there was no substantial removal of any other element.

Example 2

A further sample of the synthetic rutile feed of Example 1 was subjected to fluidised bed roasting (secondary thermal treatment) at 750° C. with a mixture of hydrogen and carbon dioxide gases in the volume ratio 1:3 for 60 minutes, followed by cooling of the bed under nitrogen flushing. The cooled solids were then leached under identical conditions to those indicated in Example 1.

The residue analysis is provided in Table 2. There has been substantially greater removal of all impurities than was the case for acid leaching without the secondary thermal treatment. X-ray diffraction analysis indicated substantial conversion of the $M_3O_5$ to the metatitanate $M_2O_3$ by roasting. Roasting for complete conversion will thus result in even further removal of impurities such as thorium.

The above examples are only a broad indication of the wide range of possibilities in applying the disclosed processing steps in integrated processes for the upgrading of general titaniferous materials to high grade products.

TABLE 1

| | Acid Leaching of as Manufactured Becher Synthetic Rutile | |
|---|---|---|
| wt % | Synthetic Rutile Feed | Acid Leach Residue |
| $TiO_2$ | 91.7 | 92.5 |
| Fe (total) | 4.3 | 3.0 |
| $SiO_2$ | 1.2 | 1.45 |
| $Al_2O_3$ | 1.2 | 1.2 |
| $V_2O_5$ | 0.24 | 0.24 |
| MnO | 1.6 | 1.5 |
| MgO | 0.34 | 0.31 |
| Th (ppm) | 411 | 352 |

TABLE 2

Acid Leaching of Becher Synthetic Rutile After Secondary Thermal Treatment

| wt % | Acid Leach Residue |
| --- | --- |
| $TiO_2$ | 93.0 |
| Fe (total) | 1.1 |
| $SiO_3$ | 1.56 |
| $Al_2O_3$ | 1.1 |
| $V_2O_5$ | 0.19 |
| MnO | 0.38 |
| MgO | 0.13 |
| Th (ppm) | 320 |

The above examples are only a broad indication of the wide range of possibilities in applying the disclosed processing steps in integrated processes for the upgrading of general titaniferous materials to high grade products.

What is claimed is:

1. A process for removing impurities from a titaniferous material that has been subjected to thermal reduction and which includes a titaniferous phase of general formula $M_3O_5$, the process including the steps of:

(i) subjecting the thermally reduced titaniferous material to a secondary heat treatment carried out in a temperature range of 700°–900° C., to convert the $M_3O_5$ phase to a more readily leachable $M_2O_3$ phase;

(ii) cooling the titaniferous material subjected to the secondary heat treatment to form a cooled heat treated titaniferous material containing the $M_2O_3$ phase;

(iii) leaching the cooled heat treated titaniferous material in an aqueous acid solution containing hydrochloric acid or sulfuric acid that is capable of dissolving at least a portion of any impurities contained in the titaniferous material to form a leachate; and (iv) separating the leachate from the titaniferous material to form a purified titaniferous material.

2. The process according to claim 1, wherein the titaniferous material contains iron and a majority of the iron in the titaniferous material subjected to the secondary heat treatment is in a ferrous or metallic state.

3. The process according to claim 1, wherein a majority of titanium in the titaniferous material subjected to the secondary heat treatment is in the tetravelent state.

4. The process according to claim 1, wherein the time of the heat treatment is between 30 minutes and 5 hours.

5. The process according to claim 1, wherein step (i) comprises contacting the thermally reduced titaniferous material with gases of controlled composition and temperature.

6. The process according to claim 5, wherein the gases comprise combustion gases.

7. The process according to claim 5, wherein the gases form a reducing atmosphere.

8. The process according to claim 1, wherein the aqueous acid solution of step (iii) comprises HCl leach liquor containing 10% HCl by weight under boiling reflux at atmosphere pressure.

9. The process according to claim 1, wherein the average residence time of the cooled heat treated titaniferous material in the aqueous acid solution in step (iii) is between 30 minutes and 10 hours.

10. The process according to claim 1 further comprising, the step of subjecting the cooled heat treated titaniferous material of step (ii) to aeration or leaching with a non-acidic leachant prior to acid leaching in step (iii).

11. The process defined in claim 10, wherein the non-acidic leachant comprises caustic soda.

12. The process according to claim 1 further comprising, the step of crushing or grinding the cooled heat treated titaniferous material of step (ii) prior to acid leaching in step (iii).

* * * * *